United States Patent [19]

Nagatani

[11] Patent Number: 4,870,869

[45] Date of Patent: Oct. 3, 1989

[54] ROTOR COMPOSITE ENGINE

[76] Inventor: Shigeo Nagatani, 29-1, Nagai Ohimachi, Ohi-Gun, Fukui-Ken. 919-21, Japan

[21] Appl. No.: 183,749

[22] PCT Filed: Aug. 11, 1987

[86] PCT No.: PCT/JP87/00603

§ 371 Date: Apr. 8, 1988

§ 102(e) Date: Apr. 8, 1988

[87] PCT Pub. No.: WO88/01342

PCT Pub. Date: Feb. 25, 1988

[30] Foreign Application Priority Data

Aug. 12, 1986 [JP] Japan ................ 61-187706

[51] Int. Cl.$^4$ ................ F02B 53/00; F02B 75/32; F16H 37/12

[52] U.S. Cl. ................ 74/52; 123/18 A; 123/197 A C

[58] Field of Search ............ 74/52, 579 E; 123/18 A, 123/197 A C; 92/67, 120

[56] References Cited

U.S. PATENT DOCUMENTS

| | | | |
|---|---|---|---|
| 1,892,474 | 12/1932 | Satrum | 123/18 A X |
| 2,506,110 | 5/1950 | Rzepela | 74/52 |
| 2,579,969 | 12/1951 | Rzepela | 74/52 |
| 2,651,206 | 9/1953 | Veille | 92/67 X |
| 3,385,272 | 5/1968 | Winogrodzki et al. | 123/18 A |
| 3,580,228 | 5/1971 | Rocha | 74/52 X |
| 4,236,416 | 12/1980 | Barcita | 74/52 |

FOREIGN PATENT DOCUMENTS

| | | |
|---|---|---|
| 2524671 | 12/1976 | Fed. Rep. of Germany . |
| 56-37066 | 8/1981 | Japan . |
| 57-153902 | 9/1982 | Japan . |
| 59-8649 | 2/1984 | Japan . |
| 59-28721 | 7/1984 | Japan . |
| 59-79002 | 8/1984 | Japan . |
| 60-22027 | 4/1985 | Japan . |

Primary Examiner—Allan D. Herrmann
Attorney, Agent, or Firm—Oblon, Spivak, McClelland, Maier & Neustadt

[57] ABSTRACT

The present invention provides a structure of an engine which employs a cylinder block the cross-sectional configuration of which defines a predetermined curved surface and a piston having the same curved surface as that of the cylinder block, thereby enabling the arcwise reciprocating motion of the piston along the curved surfaces to be transmitted in the form of rotational motion for driving a shaft. Further, the engine is arranged as being a rotor composite engine in which the arcwise reciprocating motion obtained from the cylinder block and piston having such special configurations is transmitted to a connecting rod and further to a connecting rod body having a rotor journal and a rotor gear, thereby enabling the shaft driving force to be transmitted with high efficiency.

1 Claim, 4 Drawing Sheets

ROTOR COMPOSITE ENGINE

1. Technical Field

The present invention relates to a cylinder having a special cross-sectional configuration and a piston received therein, which are arranged so as to enhance the output of an internal combustion engine for activating an automobile or the like and to considerably increase the efficiency thereof. More particularly, the present invention pertains to a structure of a rotor composite engine which employs such cylinder and piston having special cross-sectional configurations, together with a rotor journal and a main journal.

2. Background Art

There have heretofore been various types of internal combustion engine for activating automobiles or the like, i.e., the reciprocating piston type, the rotor type, a combination of the piston type and the rotor type in which the former is dominant, and a combination of the rotor type and the piston type in which the former is dominant. These various types of engine are employed in accordance with uses or the kind of apparatus which make use of them. Therefore, it is impossible to expect a uniform engine structure. This is described, for example, in "Automobile Maintenance and Repair Techniques, Second-Class Gasoline-Fueled Automobiles" compiled and published by Federation of Japan Automobile Maintenance and Repair Promoting Associations, Corp.

Disclosure of Invention

Thus, the type of internal combustion engine depends on the use or the kind of applied apparatus, and it has not yet been answered to the question as to which engine type is appropriate for enhancing the engine output and amplifying the efficiency thereof.

In view of the above-described problems of the prior art, it is an object of the present invention to provide a structure of an engine which does not belong to either the conventinal rectilinear reciprocation piston type or the conventional rotor type but has a cylinder the cross-sectional configuration of which defines a predetermined curved surface and a piston having the same curved surface as that of the cylinder, thereby enabling the arcwise reciprocating motion of the piston to be readily converted into rotational motion. Further, the above-described cylinder and piston having special configurations are arranged to form a rotor composit engine which employs a rotor journal and a rotor gear, thereby efficiently converting the above-described arcwise reciprocating motion into rotational motion and thus enhancing the engine output and amplifying the efficiency thereof to solve the above-described problems.

The present invention provides a structure of an engine employing a cylinder the cross-sectional configuration of which defines a predetermined curved surface and a piston having the same curved surface as that of the cylinder. Since the piston performs arcwise reciprocating motion, rotational motion of a shaft can be readily obtained.

The above-described rotational motion of the shaft can be obtained at high efficiency by arranging the cylinder and piston having such special configurations in the form of a rotor composite engine which employs a rotor journal and rotor gear.

BRIEF DESCRIPTION OF DRAWINGS

FIG. 4(A)(*a*) shows a side view of a connecting rod, FIG. 4(A)(*b*) shows a plan view of the connecting rod, FIG. 4(B)(*c*) shows the connecting rod body, FIG. 4(B)(*d*) shows the rotor

BEST MODE FOR CARRYING OUT THE INVENTION

The present invention will be described hereinunder in detail with reference to the drawings.

Figure 1:
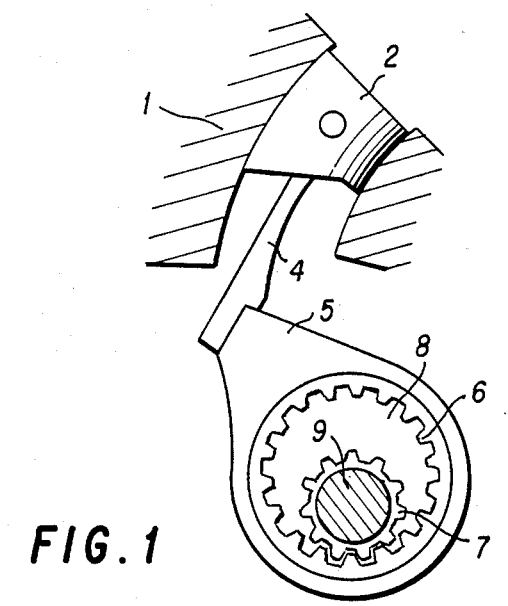
FIG. 1 shows the basic concept based on the best mode for carrying out the present invention.

FIG. 1 is a sectional view of one embodiment, showing the basic concept of the present invention.

As shown in FIG. 1, the engine having a special cross-sectional configuration in accordance with this embodiment has a structure in which a piston 2 is received in a cylinder block 1 which defines a cylinder with a predetermined curved surface, the piston 2 defining the same curved surface as that of the cylinder block 1. More specifically, the piston 2 has a predetermined curved surface and performs the engine strokes, that is, the intake, compression, combustion and exhaust strokes, within the cylinder block 1 having the same curved surface as that of the piston 2. Accordingly, the piston 2 performs arcwise reciprocating motion along these predetermined curved surfaces.

Thus, the arcwise reciprocating motion of the piston 2 is derived and put to practical use as power for an automobile or the like by making use of a rotor gear 6 of a rotor incorporated in a connecting rod body 5 having a special configuration (described later), and a center gear 7.

In this case, since the above-described piston 2 perform arcwise reciprocating motion, the motion of the piston 2 can be converted into rotational motion easier than the motion of a conventional piston 2 which reciprocates rectilinearly. In addition, since the above-described piston 2 enables rotational motion to be generated smoothly and continuously, the conversion of arcwise reciprocating motion into rotational motion can be effected at high efficiency.

A rotor composite section, which is composed of a rotor journal 8, a rotor gear 6 incorporated in the above-described connecting rod body 5 having a special configuration and a main journal 9, corresponds to the conventional crank. Such a rotor composite section is not necessarily impossible to use in an engine comprising a conventional rectilinear reciprocation type piston, but employment of this rotor composite for the arrangement comprising the above-described cylinder 1 and piston 2 having special cross-sectional configurations enables a further increase in the efficiency at which the aforementioned arcwise reciprocating motion is converted into rotational motion.

Further, when this rotor composite is employed, the descending stroke of the piston 2 can be completed for a longer time than in the case of the ascending stroke. Therefore, in the intake, compression, combustion and exhaust strokes of the engine, the compression and exhaust strokes are completed in a relatively short time, whereas the combustion and intake strokes are conducted for a relatively long time. Accordingly, it is possible to prevent leakage due to compression and increase the efficiency in each of the strokes. Thus, it is possible to obtain an engine having a higher horsepower for the same displacement.

For the purpose of facilitating the understanding of the above, the positional relationship between the piston 2 and the rotor journal 8 is shown in FIG. 2.

Figure 2A:
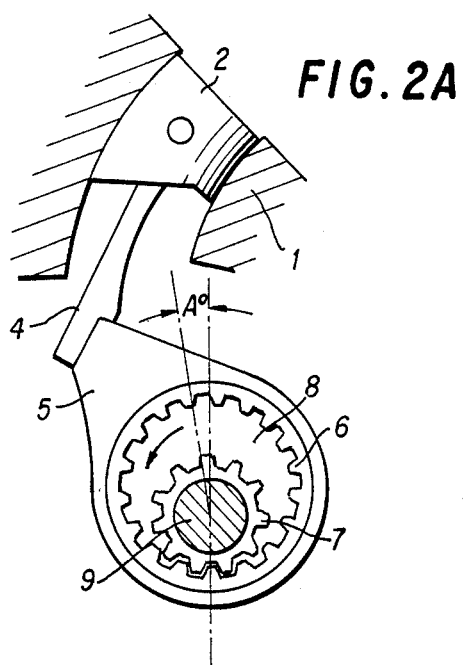
FIGS. 2(A), 2(B) and 2(C) show the positional relationship between the piston 2 and rotor journal 8 which are shown in the above-described figure illustrating the basic concept.
Figure 2B:
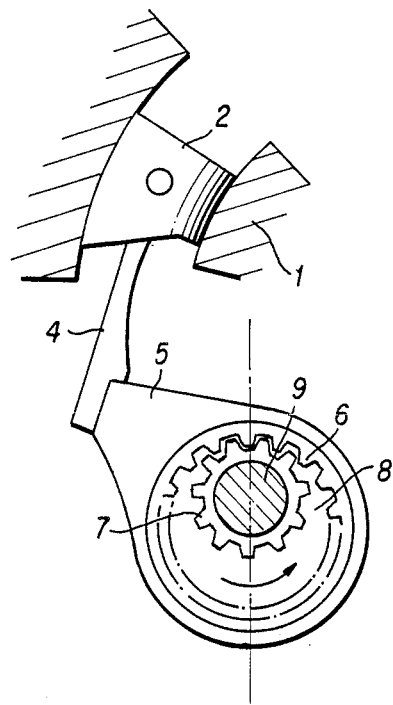

FIG. 2(A) shows the positional relationship between the piston 2 and the rotor journal 8 at the time when the piston 2 is at the top dead center; FIG. 2(B) shows the positional relationship between the piston 2 and the rotor journal 8 at the time when the piston 2 is descending; and FIG. 2(C) shows the positional relationship between the piston 2 and the rotor journal 8 at the time when the piston 2 is at the bottom dead center.

Figure 2C:
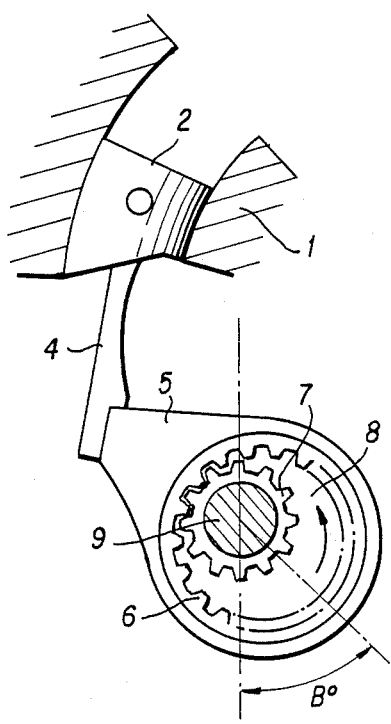

As will be clear from FIGS. 2(A), 2(B) and 2(C), when the piston 2 is at the top dead center, the rotor journal 8 is at a position slightly past the topmost position thereof in the direction of rotation relative to the main journal 9 (i.e., a position $A^o$ offset from the topmost position of the rotor journal 8 as shown in FIG. 2(A)); when the piston 2 is descending, the main journal 9 moves counterclockwise through $B^o$ from the $A^o$ offset position relative to the rotor journal 8; and when the piston 2 is at the bottom dead center, the rotor journal 8 reaches a position which is $B^o$ past the bottommost position thereof in the rotational direction relative to the main journal 9, and thereafter, as the piston ascends, the rotor journal 8 moves from the $B^o$ position to the $A^o$ position.

Accordingly, when the piston 2 descends, the shaft 10 having the main journal 9 connected thereto rotates more than in the case of the ascending stroke of the piston 2 by an amount corresponding to $B^o-A^o$.

Figure 3:
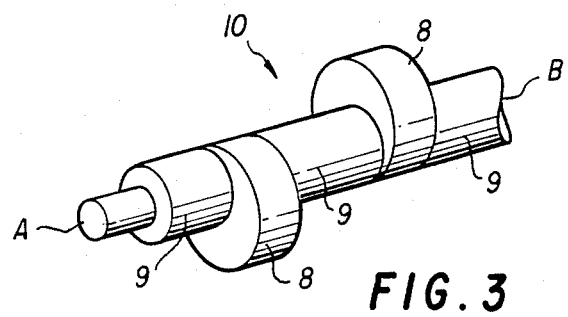
FIG. 3 shows correlation between the rotor journal 8 and main journal 9 and of the power shaft 10 which are employed in the best mode for carrying out the present invention.

FIG. 3 is a schematic view for clarifying the elements of the above-described rotor composite section. FIG. 3 shows a rotor composite section in the case of a two-cylinder arrangement in which two cylinders 1 of the type described above are disposed side by side.

It should be noted that the connecting rod section of the engine which employs the cylinder 1 and piston 2 having special cross-sectional configurations in accordance with the embodiment of the present invention cannot be arranged by employing a conventional connecting rod as it is, but it is necessary to form a connecting rod section having a special configuration. More specifically, the connecting rod section for transmitting the arcwise reciprocating motion to the rotor composite section must be arranged as follows. Since the piston 2 performs arcwise motion, the connecting rod 4 also oscillates sideward to a substantial extent about a piston pin 3 in response to the arcwise motion, and therefore the connecting rod 4 and the connecting rod body 5 must also have special configurations so that the motion of the piston 2 is not obstructed. In particular, the above-described connecting rod body 5 is formed integral with the rotor 6A incorporating the above-described rotor gear 6 and therefore their structural configurations must be special ones.

Figure 4A:
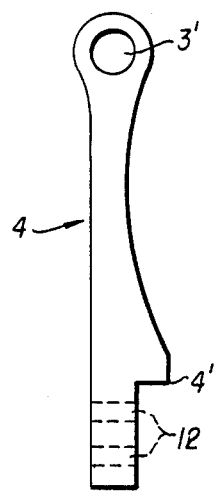
FIGS. 4(A)(*a*), 4(A)(*b*), 4(B)(*c*), 4(B)(*d*), and 4(C) show details of the invention.
Figure 4A:
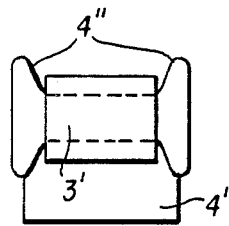
Figure 4B:
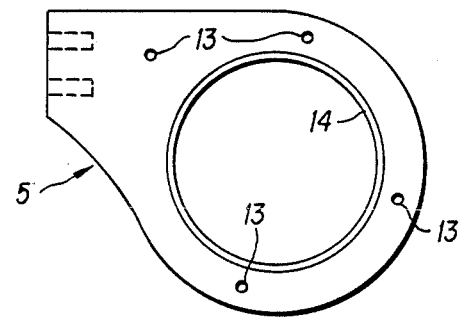
FIG. 4(C) shows a bearing cap.
Figure 4C:
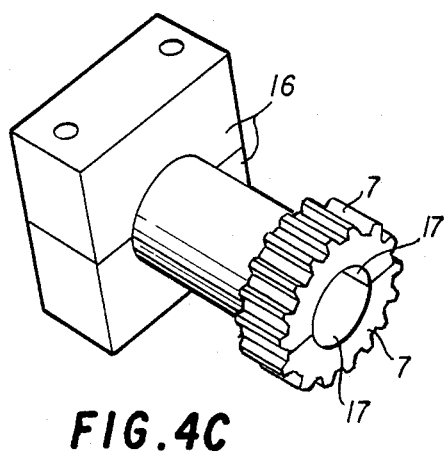
Figure 4B:
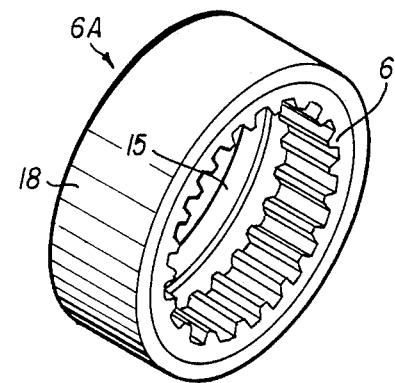
Figure 5:
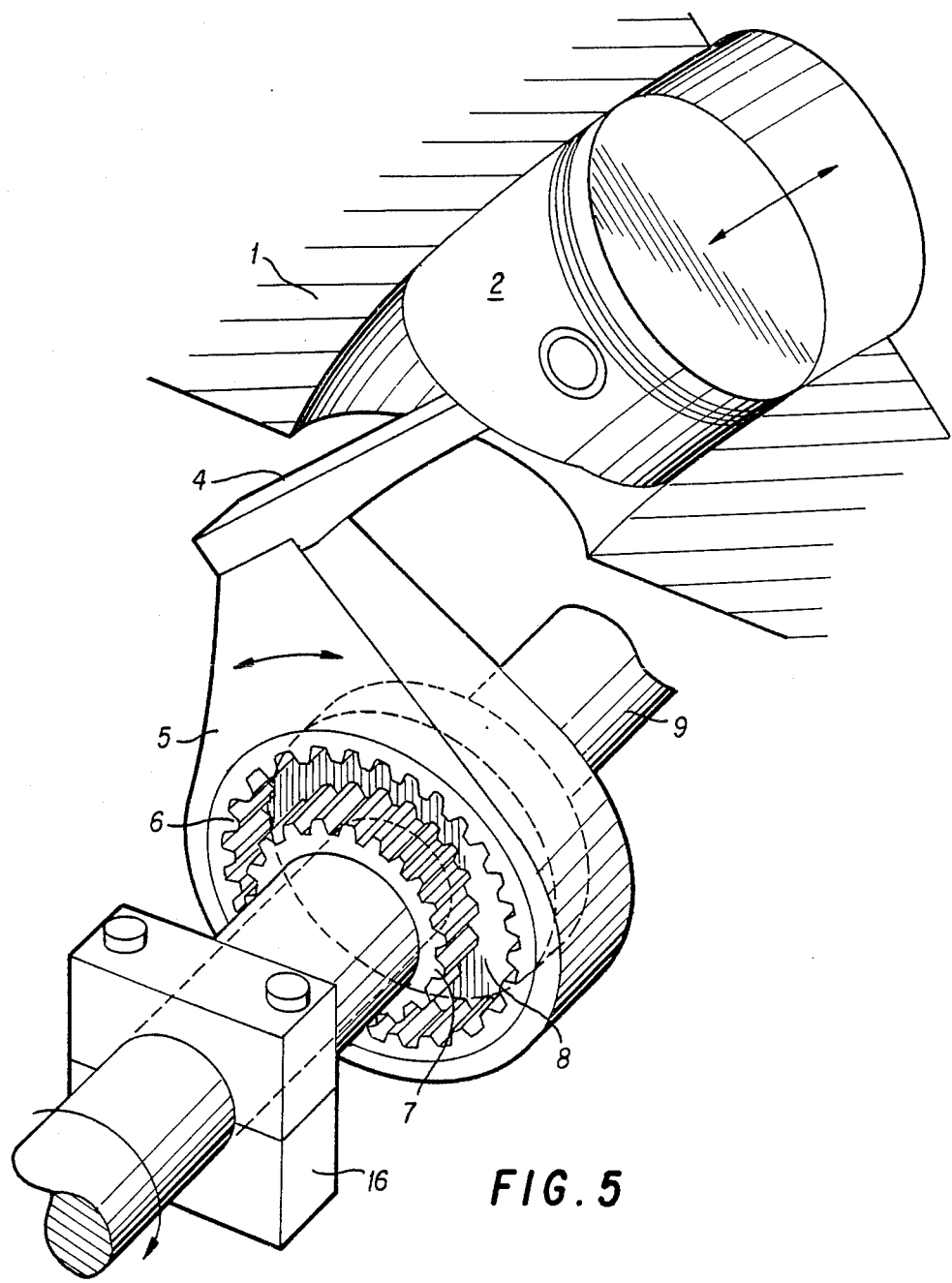
FIG. 5 is an isometric view of the rotor composite section mounted on the rotor journal and cooperating with the main journal.

FIGS. 4(A)(a), 4(A)(b), 4(B)(c) and 4(B)(d) show specific examples of the configurations of the connecting rod 4 having a special configuration, the connecting rod body 5 incorporating the rotor journal 8 and the main journal 9. FIGS. 4(A)(a) and 4(A)(b) show the connecting rod 4 in side and plan views; FIG. 4(B)(c) and 4(B)(d) generally shows the connecting rod body 5 and the rotor 6A; and FIG. 4(C) schematically shows the main journal 9 in accordance with the embodiment.

In the engine having the cylinder 1 and piston 2 having special cross-sectional configurations in accordance with this embodiment, piston rings and piston grooves which are employed to ensure air tightness between the cylinder block 1 and the piston 2 which have the same curved surfaces are formed in such a manner that the piston ring grooves and the spacing between the grooves are relatively narrow at the inner-surface side of the piston and relatively wider at the outer-surface side thereof and the prolongations of the ring grooves at the inner-surface side are coincident with the central point O of the cylinder block, in order to allow the piston rings to contact with the cylinder wall at right angles.

Further, since the cylinder wall has a curved surface, piston ring stoppers may be provided for securing the rings in such a manner that the contact surfaces of the rings are maintained in predetermined positions at all times. In order to make smooth the contact surfaces of the piston rings with the cylinder wall and also to prevent compression leakage, the piston rings are preferably formed such that the taper angle of the piston rings is the smallest at the outer-surface side and is the largest at the inner-surface side.

Since both the cylinder block 1 and the piston 2 define curved surfaces, the inner surface of the piston 2 moves less than the outer surface thereof, and the motion of the connecting rod 4 is corresponding large. Accordingly, since the motion of the outer surface of the piston 2 is relatively large, the rotation of the rotor 6A from the vertical direction toward the horizontal direction is enhanced, and the piston 2 is prevented from going through. Thus, the lower side of the connecting rod 4 which is connected by the piston pin 3 having piston pin hole 3 and side portions 4" is cut off to form projecting portion 4', and the connecting rod body 5 is secured to the cut portion of the connecting rod 4 by bolts or other means fitted in bolt holes 12 so that the connecting rod body 5 will not come off.

The rotor 6A is assembled integral with the connecting rod body 5, and the rotor gear 6 which is disposed on the inside surface of the rotor 6A is meshed with the center gear 7 which is of the split type and fixed to the bearing cap 16 which is fixed in cylinder block. The number of center gears 7 and that of rotor journals 8 are the same as the number of cylinders. The rotor gears 6 are fitted on the respective rotor journals 8, and the center gears 7 on the respective main journals 9. The rotor 6A revolves around the rotor journal 8 while rotating on its own axis.

It should be noted that a thrust washer plate (not shown) is secured to the side of the rotor journal 8 by means of bolts received in rotor thrust plate mounting bores 13 so that the rotor is prevented from coming off.

Since the number of main journals 9 is larger than that of the rotor journals by one for structural reasons, the main journal 9 is secured to the thrust main journal by means of a bearing cap, formed of cap halves 16 and having center gear 7 and bearing surface 17, equipped with a thrust bearing with no center gear so as to receive force in the axial direction.

The power shaft 10 which defines the body for these journals 8 and 9 is connected to the cylinder block 1.

It should be noted that, in order to reduce the size of the connecting rod body 5 in accordance with this embodiment, the rotor 6A shown in FIG. 4(B)(d) is modified in such a manner that the connecting rod body journal 18 of the rotor, which fits in the connecting rod body bearing 14, is made smaller than the rotor gear 6 and rounded in order to enhance the strength of the rotor 6A.

Effects of the Invention

As described in the foregoing embodiment, the present invention exhibits its effects in each of the intake, compression, combustion and exhaust strokes for the mixture of a fuel gas and air. More specifically, in the intake stroke, the suction of the fuel-air mixture effected by the piston continues for a relatively long period of time since the rotational distance of the rotor journal is relatively long, and the suction of the fuel-air mixture is therefore effected reliably. In the compression stroke, since the piston ascends quickly through a relatively short distance, compression leakage is minimized and loss of power is eliminated. Next, in the combustion stroke, the connecting rod body causes the rotor journal to rotate through the rotor, thus rotating the power shaft. Therefore, the horsepower generated from the combustion pressure increases. In addition, since the power shaft is rotated $180°+\alpha$, energy is effectively utilized. Finally, in the exhaust stroke, combustion gas is discharged quickly, and the piston stroke promptly shifts to the intake stroke.

Thus, when the functional effects of the various parts of the present invention are comprehensively observed, these functional effects amplify each other to enhance the engine output, thus amplifying the efficiency thereof.

What is claimed is:

1. A rotor composite engine comprising:
    a cylinder block defining a cylinder having a predetermined curved surface;
    a piston received in said cylinder and having a surface curved correspondingly to said curved surface of said cylinder, whereby said piston can reciprocate along a curved path in said cylinder;
    a rotatable power shaft mounted to said cylinder block;
    a connecting rod connected to said piston; and
    means connected between said connecting rod and said power shaft for converting reciprocating movements of said piston into rotation of said power shaft, wherein said converting means comprises:
    a stationary center gear, and
    a rotor journal mounted between said power shaft and said connecting rod and having rotor teeth meshing with said center gear.

* * * * *